US007210858B2

(12) United States Patent
Sago et al.

(10) Patent No.: US 7,210,858 B2
(45) Date of Patent: May 1, 2007

(54) OPTICAL CONNECTOR WITH MEMORY FUNCTION

(75) Inventors: Masuyuki Sago, Tokyo-To (JP); Masanori Enomoto, Tokyo-To (JP)

(73) Assignee: Tokyo Communications Equipment Co., Ltd., Minato-ku, Tokyo-To (JP)

( * ) Notice: Subject to any disclaimer, the term of this patent is extended or adjusted under 35 U.S.C. 154(b) by 49 days.

(21) Appl. No.: 10/662,669

(22) Filed: Sep. 15, 2003

(65) Prior Publication Data
US 2004/0120657 A1    Jun. 24, 2004

(30) Foreign Application Priority Data

Jan. 15, 2002   (JP)   ............................. 2002-005642
Jan. 8, 2003    (WO)   ...................... PCT/JP03/00082

(51) Int. Cl.
*G02B 6/36* (2006.01)

(52) U.S. Cl. .......................................... 385/88; 385/92
(58) Field of Classification Search ............ 385/53–94
See application file for complete search history.

(56) References Cited

U.S. PATENT DOCUMENTS 5,636,020 A * 6/1997 Csipkes et al. ............. 356/505
5,821,510 A * 10/1998 Cohen et al. ............... 235/375
7,027,704 B2 * 4/2006 Frohlich et al. ............ 385/135

\* cited by examiner

*Primary Examiner*—Sung Pak
*Assistant Examiner*—Tina M. Wong
(74) *Attorney, Agent, or Firm*—Myron Greenspan, Esq.; Lackenbach Siegel, LLP

(57) ABSTRACT

An optical connector with memory function comprises memory function for storing respective identification information in order to readily and exactly perform separate control of respective control steps and further to obtain convenient handling of connectors. The optical connector with memory function 3 of the present invention is characterized by a memory function capable of untouchably performing, from outside thereof, writing-in and reading-out of necessary information. The memory function has a structure mounted on or mountable on the outer construction of a housing accommodating therein the optical connection portion of an optical connector plug in the optical connector with memory function.

6 Claims, 4 Drawing Sheets

OPTICAL CONNECTOR WITH MEMORY FUNCTION

This application claims priority from International Application No. PCT/JP03/00082, filed Jan. 8, 2003, which in turn claims priority from Japanese Application No. 005642/2002, filed Jan. 15, 2002.

TECHNICAL FIELD

The present invention relates to an optical connector, and, especially, to an optical connector with memory function for control information.

BACKGROUND OF THE INVENTION

On many conventional optical connectors, a label or a tape, on which optional letters or bar codes are recorded, is pasted for individual control information. In other examples, grouped control information, such as lot numbers or manufactured dates, is recorded.

In case of controlling production steps or mounting and wiring steps of optical connectors in these conditions, such control operations are usually performed by the use of computers. In this case, mistake such as erroneous understanding or erroneous inputting of control information shall be occasionally occurred, if letters are employed as the control information, since an operator performs the inputting operations in reading of the letters of control information.

On the other hand, in a case where the control information of bar code is recorded, read-in operations are essential before and after a working operation step, while erroneous understanding or erroneous inputting of control information is especially reduced. Accordingly, if the read-in operation is overlooked at a working operation step, reliable control of this working operation step cannot be performed.

Moreover, when the control information is recorded on a label or a tape, each of the label and the tape has to have an appropriate size for recognizing the control information. In this case where optical connectors carrying control information of these label and tape are accumulated on a distributing board in a real application circumstance, the label itself becomes considerable obstacle for freely manipulation so that the convenience of operation using the control information of this type is disturbed.

Furthermore, if material of the label and the tape is of paper, the label and the tape may be damaged, so that the control information cannot be recognized and then controlled.

BRIEF SUMMARY OF THE INVENTION

An object of the present invention is to provide an optical connector with memory function, which comprises the memory function for storing respective identification information in order to readily and exactly perform separate control of respective control steps and further to obtain convenient handling of connectors.

To attain the above object and other objects of the present invention, the optical connector with memory function of the present invention comprises an optical connector plug and an adapter provided to be coupled to said optical connector plug. The optical connector with memory function further comprises memory function capable of untouchably performing writing-in and reading-out of necessary information from outside thereof.

The memory function has an integrated circuit formed into an electromagnetic induction system.

The memory function has a structure mounted on or mountable on the outer construction of a housing accommodating therein the optical connection portion of the optical connector plug.

An antenna is mounted on the adapter to electromagnetic-inductively couple to the integrated circuit.

BRIEF DESCRIPTION OF THE DRAWINGS

The present invention will be described in details below with reference to accompanying drawings, in which.

DETAILED DESCRIPTION OF PREFERRED EMBODIMENTS

The present invention will be more precisely described with reference to accompanying drawings.

Figure 1A:
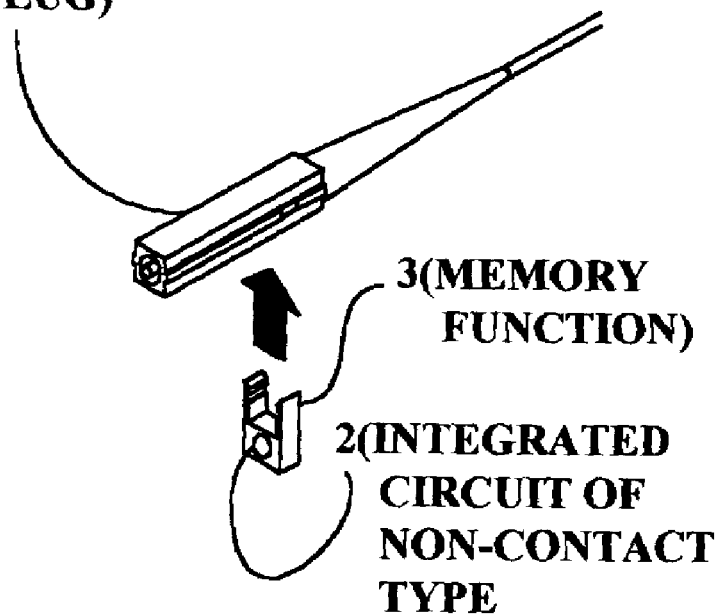
FIG. 1A is a perspective view illustrating construction examples of respective parts of basic examples of the optical connector plug employed in the present invention.
Figure 1B:
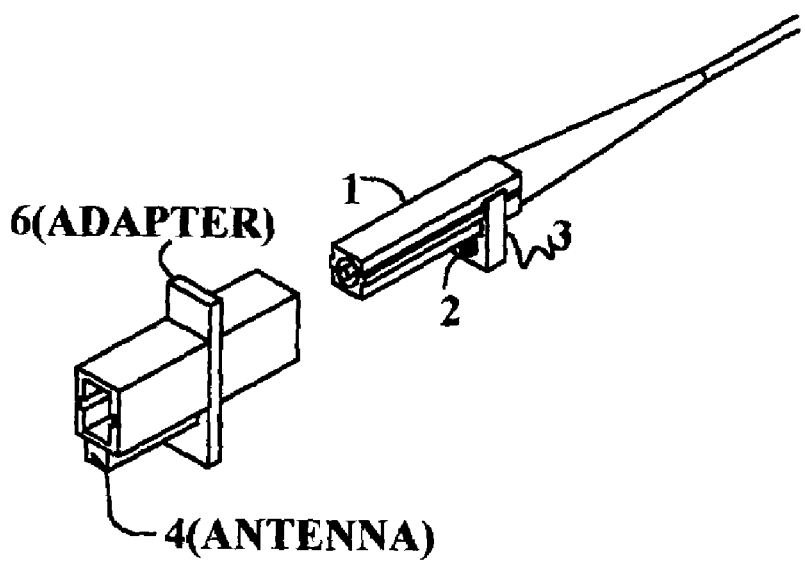
FIG. 1B is a perspective view illustrating a combined example of the respective parts of the optical connector with memory function of the present invention.

An optical connector 10 with memory function of the present invention comprises, as illustrated in FIG. 1A and FIG. 1B, an optical connector plug 1 including an optical connection portion, and a memory function 3 having an integrated circuit of non-contact type, which is formed into an electromagnetic induction system applied to IC cards and IC fixed-term tickets developed as RFID (Radio Frequency Information Distributor) systems. Moreover, a read-write device comprises, as shown in FIG. 2, an antenna 4 having electromagnetic induction coupling to the integrated circuit 2 of non-contact type, and a controller 5 provided for controlling the antenna 4.

Figure 2:
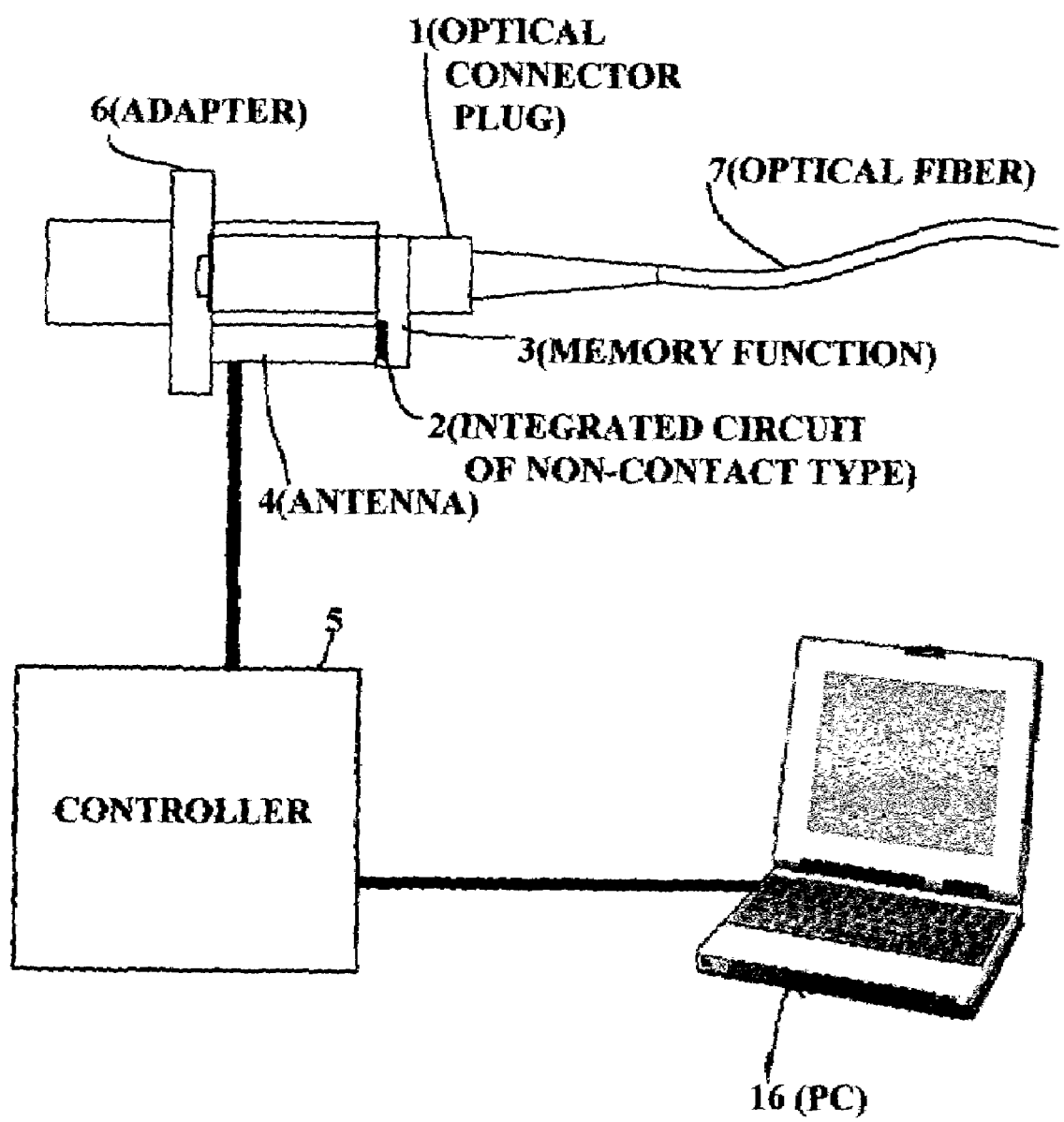
FIG. 2 is a connection diagram of respective devices explanatory of an application state of the optical connector with memory function of the present invention.

When the optical connector plug 1 is inserted into an adapter 6 as shown in FIG. 2, the controller 5 communicates to the memory function 3 of the side of the optical connector 10 by way of the antenna 4 positioned near the adapter 6 to perform the reading-out and writing-in of necessary information, so that the device operates as the optical connector 10 with memory function.

Into the memory function 3 of the optical connector 10 with memory function, peculiar identification information (hereinafter referred to "peculiar ID") is previously stored. This identification information is a unique one so that there do not two of the same identification information.

The object of the present invention is attainable by providing the optical connector 10 with memory function as mentioned above. The followings are concrete application examples in correspondence to the objects of the present invention.

(Application I)

In an optional one of working steps for mounting an optical fiber 7 on the optical connector plug 1, the peculiar ID is read in the memory function 3 of the optical connector plug 1, while contents of the working steps and the working date and time are additionally applied to a computer 16, such as a personal computer (referred to "PC"), so that unitary control of respective working steps can be performed. Therefore, each item of the working date and time, the worker and the working step name, etc. can be readily pursued from the peculiar ID to enhance the transmission quality of the optical connector plug 1.

(Application II)

The peculiar ID is automatically read out from the memory function 3 of the optical connector plug 1 in each working step and then automatically read out by the antenna 4 to the controller 5 to supply the same to the computer 16. In this application II, the above-mentioned erroneous inputting of the control information and overlook of read-in operation of the control information can be effectively eliminated.

(Application III)

Figure 3:
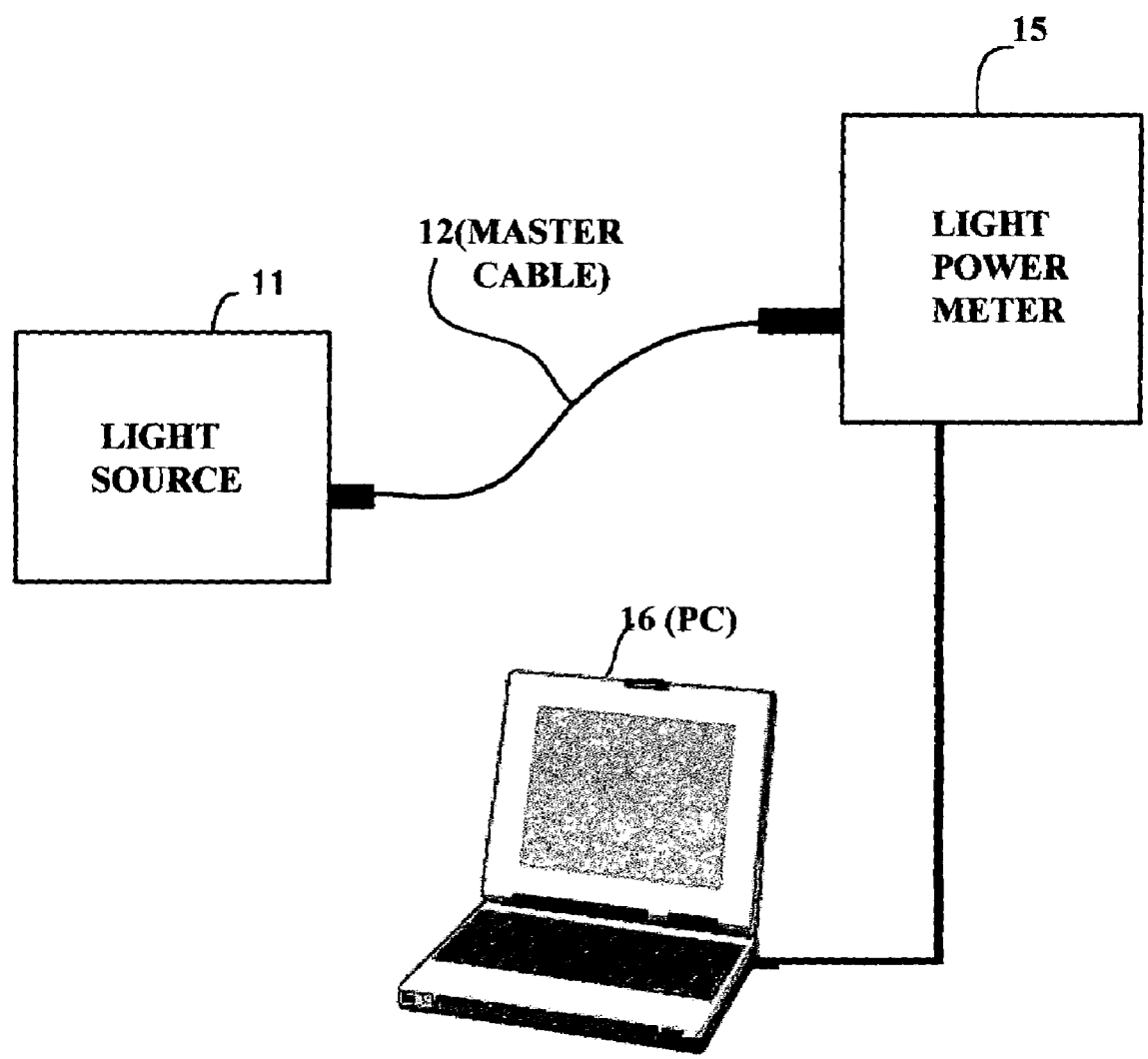
FIG. 3 is a connection diagram of respective devices explanatory of measurement of a standard value in case of measuring an insertion loss characteristic of the optical connector with memory function of the present invention.
Figure 4:
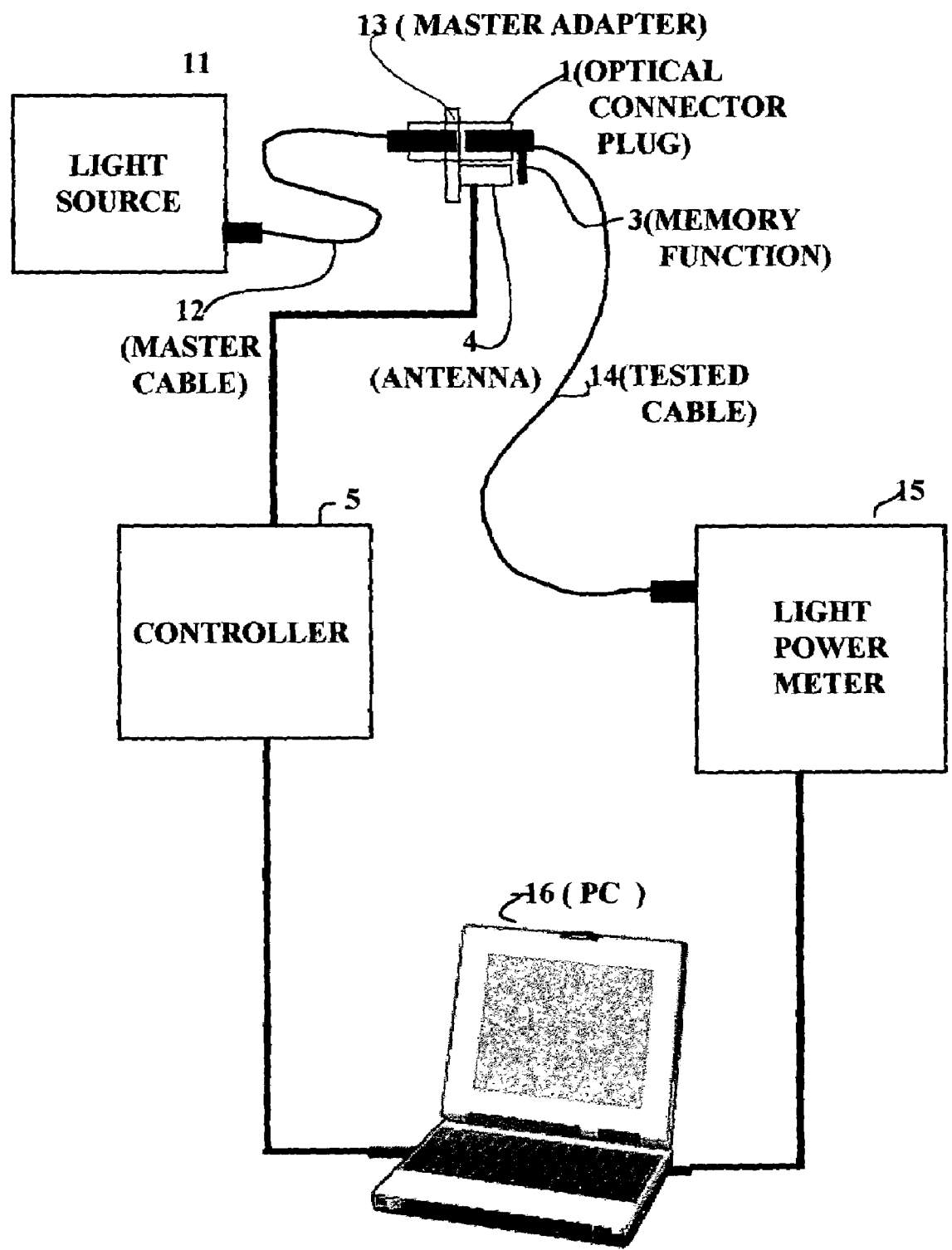
FIG. 4 is a connection diagram of respective devices explanatory of input and output operations of identification information in the optical connector with memory function of the present invention.

The present invention can be effectively applicable to a measurement operation of insertion loss. In this application, a light source 11, a master cable 12, a master adapter 13, a tested cable 14 to be measured and a light power meter 15 are employed as illustrated in FIG. 3 and FIG. 4. The light power meter 15 has outer connection means in order to be readable the indicated information thereof by the computer 16. Moreover, to the tested cable 14 is mounted the optical connector 10 with memory function according to the present invention, to the memory function 3 of which the peculiar ID is read in.

In this application III, a standard value is at first measured. To this end, the light source 11, the master cable 12 and the light power meter 15 are mutually connected as illustrated in FIG. 3. The indication value of the light power meter 15 of this condition is stored, as the standard value, in the computer 16 through the outer connection means.

To measure the insertion loss, a series connection of the master adapter 13 and the tested cable 14 are inserted between the light power meter 15 and the master cable 12. In this case, the antenna 4 of the controller 5 is mounted on the master adapter 13 for reading-out and writing-in control information in relation to the memory function 3, and the optical connector 10 with memory function is connected to one end of the tested cable 14. When the tested cable 14 is connected as illustrated in FIG. 4, the peculiar ID is read out from the memory function 3 of the optical connector 10 by the controller 5 through the antenna 4 and then stored to the computer 16.

When the tested cable 14 is connected as illustrated in FIG. 4, the indication value of the light power meter 15 is read out to the computer 16 through the outer connection means. An insertion loss characteristic of the optical connector 1 can be obtained by subtracting the standard value from the indication value.

As mentioned above, the peculiar ID and the insertion loss of the tested cable 14 are stored in relation to each other, so that a characteristic of the tested cable 14, to which the optical connector 10 is connected, can be effectively controlled.

INDUSTRIAL APPLICABILITY

As described in details above, since the memory function and the connector is formed into unitary structure in accordance with the present invention, the optical connector provided in accordance with the present invention has a miniaturized formation which is readily operable without any troublesome. Moreover, readout means is directly connected to the computer to apply automatically the control information thereto, the control information can be reliably controlled without any human operation, which accompanies with miss inputting of the control information.

The invention claimed is:

1. An optical connector for use with optical cables comprising
    an optical plug for interfacing with the end of an optical cable and an optical adapter optically connecting two optical plugs to each other, each of which can be mounted at the end of an optical cable;
    electronic means associated with an optical plug containing data identifying a cable to which said optical plug is connected, and
    contactless reading/writing means on said optical plug and on said adapter for transferring identifying data in the form of electrical signals from said electronic means to a reading device when an optical plug associated with a predetermined cable is connected to said optical plug, wherein said memory means is an integrated circuit formed into an electromagnetic induction system.

2. An optical connector for use with optical cables comprising
    an optical plug for interfacing with the end of an optical cable and an optical adapter optically connecting two optical plugs to each other, each of which can be mounted at the end of an optical cable;
    electronic means associated with an optical plug containing data identifying a cable to which said optical plug is connected, and
    contactless reading/writing means on said optical plug and on said adapter for transferring identifying data in the form of electrical signals from said electronic means to a reading device when an optical plug associated with a predetermined cable is connected to said optical plug, wherein an antenna is mounted on said adapter to electromagnetically-inductively couple to an integrated circuit.

3. An optical connector for use with optical cables comprising
    an optical plug for interfacing with the end of an optical cable and an optical adapter optically connecting two optical plugs to each other, each of which can be mounted at the end of an optical cable;
    electronic means associated with an optical plug containing data identifying a cable to which said optical plug is connected, and
    contactless reading/writing means on said optical plug and on said adapter for transferring identifying data in the form of electrical signals from said electronic means to a reading device when an optical plug associated with a predetermined cable is connected to said optical plug, wherein said optical plug includes memory means mounted on a housing accommodating therein an optical connection portion of said optical connector plug, an antenna being mounted on said adapter to electromagnetically-inductively couple to an integrated circuit.

4. An optical connector for use with optical cables comprising
- an optical plug for interfacing with the end of an optical cable and an optical adapter optically connecting two optical plugs to each other, each of which can be mounted at the end of an optical cable;
- electronic means associated with an optical plug containing data identifying a cable to which said optical plug is connected, and
- contactless reading/writing means on said optical plug and on said adapter for transferring identifying data in the form of electrical signals from said electronic means to a reading device when an optical plug associated with a predetermined cable is connected to said optical plug, wherein said optical plug includes memory means mountable on an outer construction of a housing accommodating therein an optical connection portion of said optical connector plug, an antenna being mounted on said adapter to electromagnetically-inductively couple to an integrated circuit.

5. A system for testing insertion loss in optical cables comprising:
- an optical connector including an optical plug interfacing with an end of an optical cable to be tested and an adapter for optically connecting two optical plugs to each other, each of which can be mounted at the end of another optical cable;
- a light source;
- a master optical cable optically connected at one end to said light source;
- electronic means associated with said optical plug containing data in the form of electrical signals identifying a cable to be tested;
- computing means;
- contactless reading/writing means on said optical plug and on said adapter for transferring and identifying data from said electronic means to said computing means when an optical plug associated with a cable to be tested is connected to said adapter; and
- a light power meter having an input for receiving an optical signal and having an output connected to said computing means for generating a signal indicative of the light intensity at said input, said master optical cable being selectively connected at the other end directly to said light power meter to obtain a reference light intensity at said light power meter and to said adapter when the optical cable to be tested is connected to said adapter and to said light power meter,
- whereby the insertion loss determined by said computing means can be associated with a specific cable characterized by said identifying data.

6. Method for testing insertion loss of optical cables comprising the steps of:
- interfacing an optical connector including an optical plug with an end of an optical cable to be tested and an adapter for optically connecting two optical plugs to each other, each of which can be mounted at the end of another optical cable;
- optically connecting said adapter to said light source by means of a master optical cable;
- obtaining a reference reading by connecting said master optical cable directly to a light power meter and computer means;
- subsequently optically connecting said master optical cable to said adapter and connecting a cable to be tested, with an optical plug, to said adapter and said light power meter for attaining a light intensity representative of the insertion loss of the cable being tested;
- determining with said computing means the insertion loss by comparing the light intensities when said master optical cable is selectively connected directly to the light power meter and when connected in series with a cable being tested; and
- contactless reading/writing identifying data on said optical plug and on said adapter for transferring said identifying data from said electronic means to said computing means when an optical plug associated with a cable to be tested is connected to said optical plug;
- whereby the insertion loss determined by said computing means can be associated with a specific cable characterized by said identifying data.

* * * * *